(12) United States Patent
Iekel-Johnson et al.

(10) Patent No.: US 11,558,410 B2
(45) Date of Patent: Jan. 17, 2023

(54) MEASUREMENT AND ANALYSIS OF TRAFFIC FILTERED BY NETWORK INFRASTRUCTURE

(71) Applicant: Arbor Networks, Inc., Westford, MA (US)

(72) Inventors: Scott Iekel-Johnson, Ann Arbor, MI (US); James Edward Winquist, Ypsilanti, MI (US); David Watson, Ann Arbor, MI (US)

(73) Assignee: Arbor Networks, Inc., Westford, MA (US)

( * ) Notice: Subject to any disclaimer, the term of this patent is extended or adjusted under 35 U.S.C. 154(b) by 269 days.

(21) Appl. No.: 16/877,854

(22) Filed: May 19, 2020

(65) Prior Publication Data

US 2020/0382540 A1    Dec. 3, 2020

Related U.S. Application Data

(60) Provisional application No. 62/854,049, filed on May 29, 2019.

(51) Int. Cl.
*H04L 9/40* (2022.01)

(52) U.S. Cl.
CPC ...... *H04L 63/1425* (2013.01); *H04L 63/0236* (2013.01); *H04L 63/0263* (2013.01); *H04L 63/1416* (2013.01); *H04L 63/1458* (2013.01); *H04L 63/20* (2013.01)

(58) Field of Classification Search
CPC . H04L 63/02; H04L 63/0236; H04L 63/2063; H04L 63/0227; H04L 63/0245; H04L 63/14; H04L 63/1408; H04L 63/1416; H04L 63/1425; H04L 63/1458; H04L 63/20

See application file for complete search history.

(56) References Cited

U.S. PATENT DOCUMENTS

| | | | | |
|---|---|---|---|---|
| 10,313,372 | B2* | 6/2019 | Heilig | H04L 63/1425 |
| 2015/0295787 | A1* | 10/2015 | Kakadia | H04L 41/5035 |
| | | | | 370/236 |
| 2016/0191466 | A1* | 6/2016 | Pernicha | H04L 63/20 |
| | | | | 726/1 |
| 2017/0013018 | A1* | 1/2017 | Nakata | H04L 12/6418 |
| 2017/0126740 | A1* | 5/2017 | Bejarano Ardila | |
| | | | | H04L 63/0263 |
| 2020/0028866 | A1* | 1/2020 | Kurakami | H04L 63/1425 |

\* cited by examiner

*Primary Examiner* — Shaqueal D Wade-Wright
(74) *Attorney, Agent, or Firm* — Locke Lord LLP; Scott D. Wofsy; Christopher J. Capelli (57) ABSTRACT

A computer-implemented method and device for analyzing network packet traffic flow affected by a network security device in a communication network. Received in a network monitoring device is packet traffic flow data from a network security device that filters network traffic based upon prescribed security filter settings. The network monitoring device analyzes the received packet traffic flow data by correlating the received traffic flow data with the security filter settings prescribed in the network security device. Certain statistics are identified regarding the network traffic flow affected by the security filter settings of the network security device based upon the correlating of the received traffic flow data with the security filter settings prescribed in the network security device. A report regarding the identified statistics is preferably sent to a network administrator.

18 Claims, 4 Drawing Sheets

MEASUREMENT AND ANALYSIS OF TRAFFIC FILTERED BY NETWORK INFRASTRUCTURE

CROSS REFERENCE TO RELATED APPLICATIONS

This application claims priority to U.S. patent application Ser. No. 62/854,049 filed May 29, 2019 which is incorporated herein by reference in its entirety.

FIELD OF THE INVENTION

This invention relates generally to network communication systems, and more specifically to mitigating security threats in a network communication systems.

BACKGROUND OF THE INVENTION

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. Networks may be attacked by various threats such as viruses, worms, denial of service attacks, and other damaging problems. If not mitigated properly, these threats can impair a network by disrupting communication, violating privacy, or compromising the integrity of information within the network. Known techniques for mitigating threats include accessing each network device separately, and implementing mitigating operations at each device to block specific traffic or packets. These known techniques, however, are not efficient in certain situations. It is generally desirable to efficiently mitigate threats.

It is thus to be appreciated that in view of increasing size and frequency of malicious network attacks (e.g., DDoS attacks), network operators are increasingly making resort to technologies that block undesirable traffic using the network infrastructure that is carrying the traffic (e.g. a network router) without resort to specialized (and often expensive) network equipment specifically configured for blocking network attacks. It is to be further appreciated that when network operators are blocking traffic using such pre-existing network infrastructure devices (e.g., network routers), it is important for the operators to have visibility regarding the mount of traffic being blocked on each network device, and why it is being blocked (i.e. which of the many blocking rules installed (e.g., security filter settings) are causing a given network traffic flow to be blocked). It is additionally desirable for network operators to receive detailed information regarding the nature (parameters) of the network traffic being blocked (e.g., beyond simple traffic volume measurements). This would provide a network operator with visibility as to if a network attack is still ongoing, how it may be changing, and derive detailed information regarding the attack (including, but not limited to, the sources of the attack (country, IP address, network, organization), the types of traffic present in the attack, the targets of the attack and how they may be changing, and many other elements of interest about the nature of the traffic). It is to be appreciated that this type of information (with emphasis on detailed dropped traffic reporting) is essential for in-depth understanding of whether legitimate traffic is being inadvertently blocked by the blocking rules (e.g., security filter settings) and thus whether adjustments are needed to prevent the unintended dropping and/or other mitigation of legitimate traffic.

However, currently there is no effective solutions for providing network operators with the aforesaid visibility regarding mitigated network traffic caused by network infrastructure. It is noted that certain vendors have provided network equipment using proprietary methods to gather basic information such as the total bytes and packets dropped by each blocking rule, but however, they do not provide any further detailed information regarding why for instance certain traffic was dropped. Some vendors do not provide these types of traffic statistics with no standards for querying these statistics either.

As a result, it is currently difficult (if even reasonably possible) for network operators to gather the aforesaid network traffic flow regarding mitigation performed by pre-existing network infrastructure (e.g., network routers). One simple reason is because each provider of pre-existing network infrastructure typically uses their own proprietary interface which a network operator may have no means to interface with to gather such information.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

One aspect of the illustrated embodiments is to provide a network monitoring device coupled to one or more pre-existing network infrastructure devices (e.g., network routers) that perform mitigation actions for gathering traffic flow data from such pre-existing infrastructure devices. The network monitoring device being configured and operable to determine the efficiency of the current network traffic rules (e.g., security filter settings) currently employed by the pre-existing network infrastructure devices.

In another aspect, disclosed is a computer-implemented method and device for analyzing network packet traffic flow affected by pre-existing infrastructure network devices configured to perform network functionality in a communication network. In accordance with the exemplary illustrated embodiments, one such pre-existing infrastructure network device is a network router. For descriptive purposes, a "network router" and "network security device" are to be interchangeable referred to herein. It is also to be appreciated that pre-existing infrastructure network devices are not to be understood to be limited to network router devices as other pre-existing infrastructure devices (preferably capable of performing network security functionality) are to be understood to be encompassed by the described illustrated embodiments.

Received in a network monitoring device is packet traffic flow data from a network security device (e.g., a router device) that filters network traffic based upon prescribed security filter settings. The network monitoring device analyzes the received packet traffic flow data by correlating the received traffic flow data with the security filter settings prescribed in the network security device. Certain statistics are identified regarding the network traffic flow affected by the security filter settings of the network security device based upon the correlating of the received traffic flow data with the security filter settings prescribed in the network security device. A report regarding the identified statistics is preferably sent to a network administrator.

In yet another aspect, the prescribed security filter settings may be adjusted in the network security device by the network monitoring device based upon the analyzing of the received traffic flow data and identifying certain statistics regarding the analyzed traffic flow. An object of the adjusting the settings of the network security filter is to ensure one or more mitigations actions are being performed on bad traffic flow (e.g., malicious attack traffic) while good traffic flow (e.g., legitimate traffic) is not adversely effected by the network security filter settings.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Figure 1:
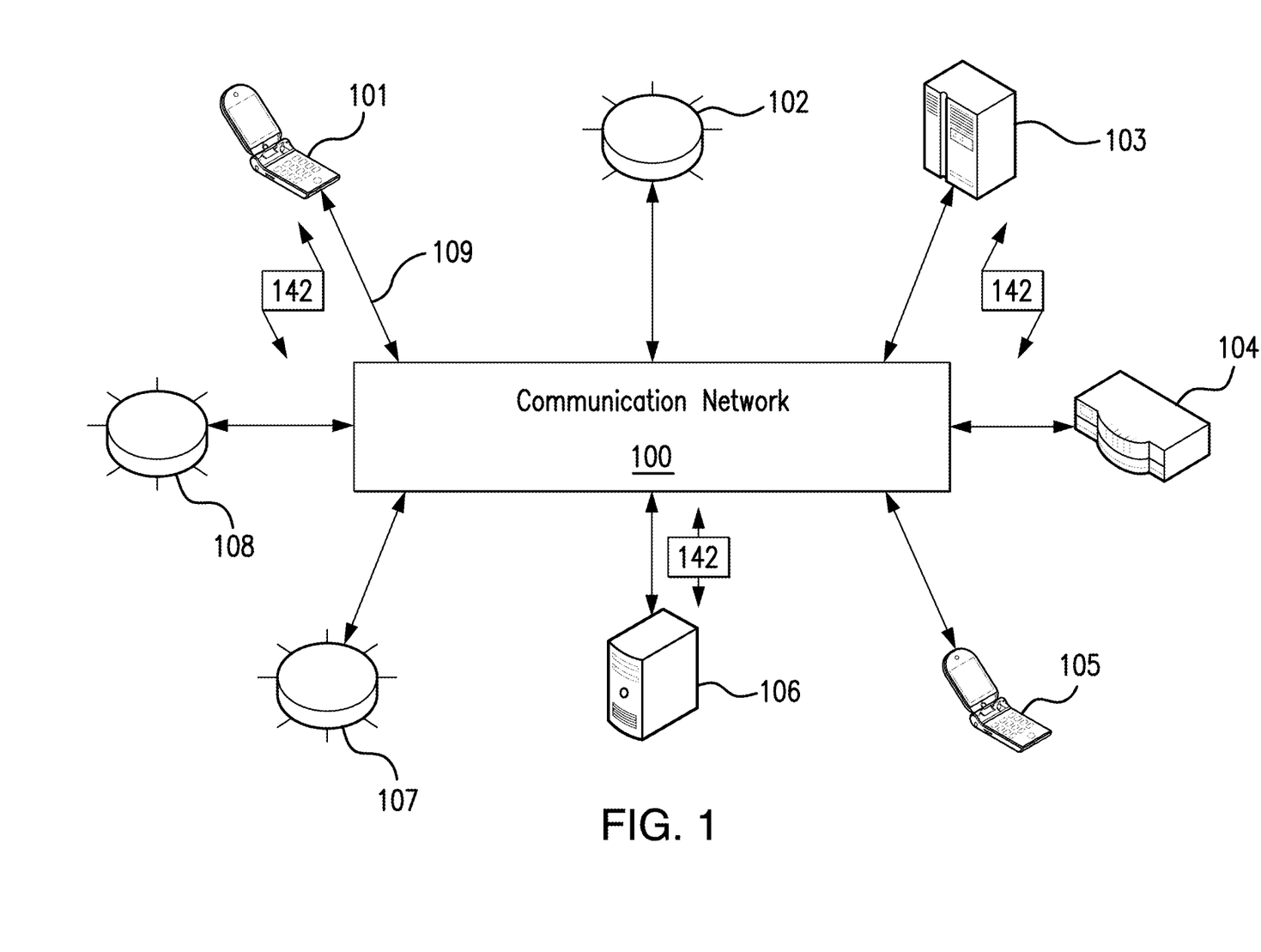
FIG. 1 illustrates an example communication network.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., switching devices 102, a network monitoring device 104, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 2:
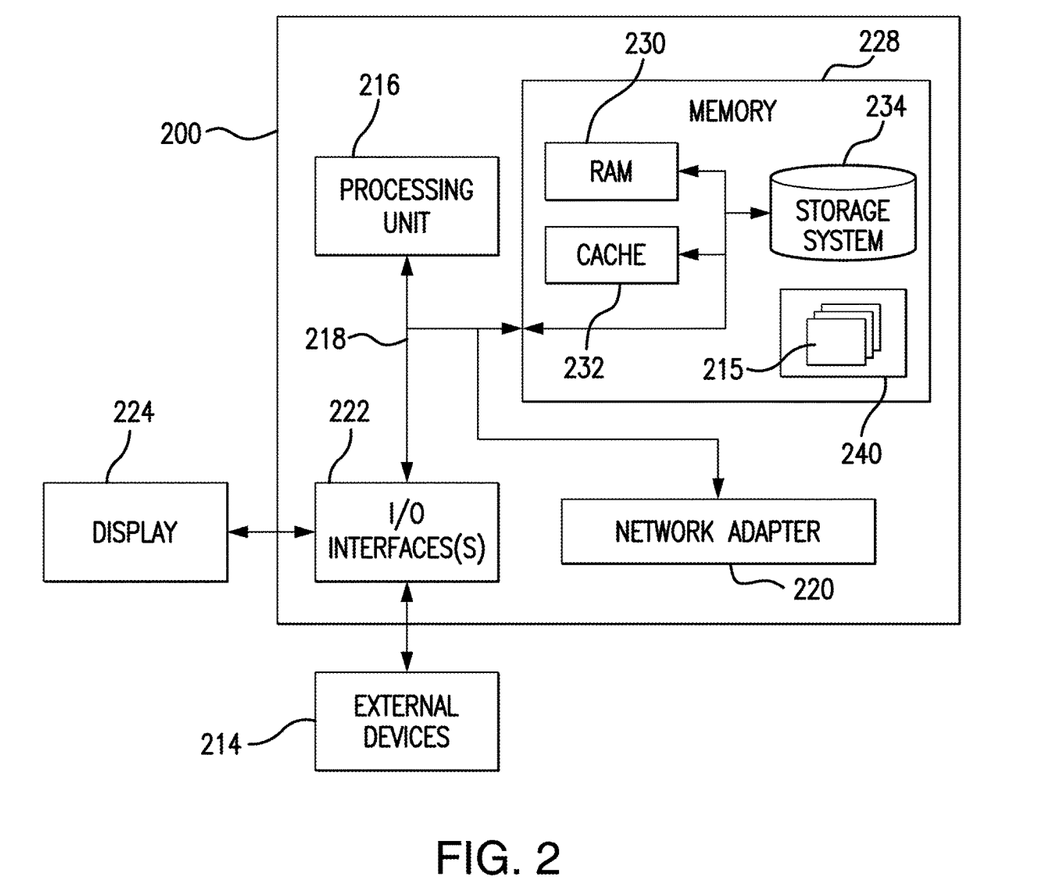
FIG. 2 illustrates an example network device/node coupled to the communication network of FIG. 1.

FIG. 2 is a schematic block diagram of an example network computing device 200 (e.g., network monitoring device 104, routers 107, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
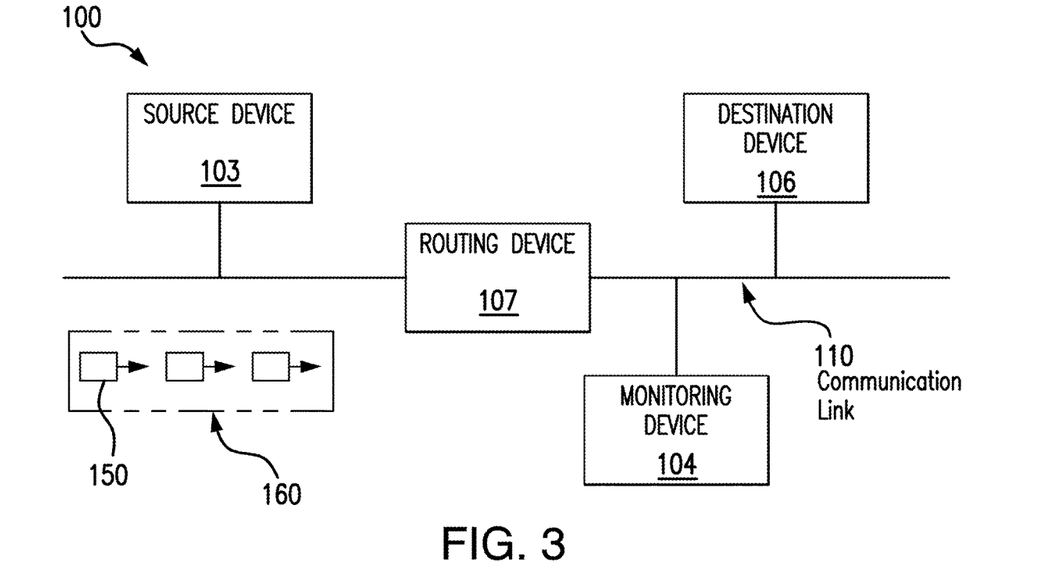
FIG. 3 illustrates a network in which routing responsive to message flow patterns is performed in accordance with the illustrated embodiments.
Figure 4:
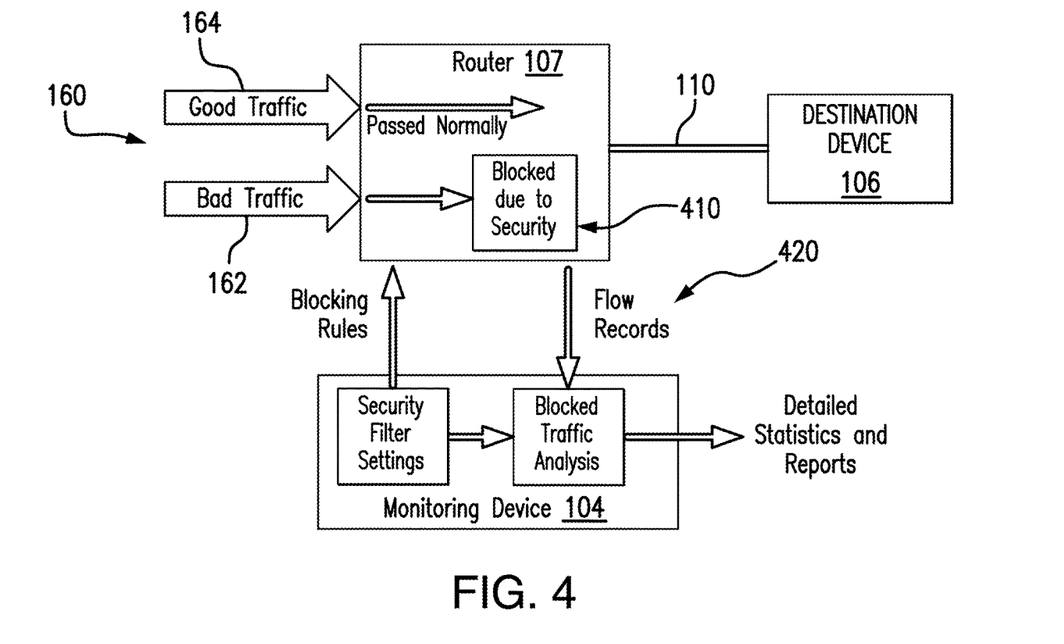
FIG. 4 illustrates communicative coupling between a network device and monitoring device from FIG. 3 in accordance with the illustrated embodiments.

With the exemplary communication network 100 (FIG. 1) and computing device 200 (FIG. 2) being generally shown and discussed above, description of certain illustrated embodiments of the present disclosure will now be provided with reference FIGS. 3 and 4. A network 100 includes at least one communication link 110, at least one source device 103, at least one destination device 106, and at least one routing device 107. The routing device 107 is disposed for receiving a set of packets 150 from the source device 103 and routing them to the destination device 106. The communication link 110 may comprise any form of physical media layer, such as ethernet, FDDI, or HDLC serial link.

The routing device 107 preferably includes a routing processor for performing the process steps described herein, and may include specific hardware constructed or programmed performing the process steps described herein, a general purpose processor operating under program control, or some combination thereof.

A message flow 160 consists of a unidirectional stream of packets 150 to be transmitted between particular pairs of transport service access points (thus, network-layer addresses and port numbers). In a broad sense, a message flow 160 thus refers to a communication "circuit" between communication end-points. In an illustrated embodiment, and for exemplary and ease of description purposes, a message flow 160 is preferably defined by a network-layer address for a particular source device 103, a particular port number at the source device 103, a network-layer address for a particular destination device 106, a particular port number at the destination device 106, and a particular transmission protocol type. For example, the transmission protocol type may identify a known transmission protocol, such as UDP, TCP, ICMP, or IGMP (internet group management protocol).

In accordance with description of the exemplary illustrated embodiments, for use with a network of networks (an "internet"), the particular source device 103 is identified by its IP (internet protocol) address. The particular port number at the source device 103 is identified by either a port number which is specific to a particular process, or by a standard port number for the particular transmission protocol type. For example, a standard protocol number for the TCP protocol type is 6 and a standard protocol number for the UDP protocol type is 17. Other protocols which may have standard port numbers include the FTP protocol, the TELNET protocol, an internet telephone protocol, or an internet video protocol such as the "CUSeeMe" protocol; these protocols are known in the art of networking. It is noted the aforesaid protocols are typically applications that run on top of TCP or UDP, and use a standard port number assigned to that application and associated with that protocol for communication. Similarly, the particular destination device 106 is identified by its IP (internet protocol) address; the particular port number at the destination device 106 is identified by either a port number which is specific to a particular process, or a standard port number for the particular transmission protocol type.

It will be clear to those skilled in the art, after perusing this application, that the concept of a message flow is quite broad, and encompasses a wide variety of possible alternatives within the scope and spirit of the invention. For example, in alternative embodiments, a message flow may be bi-directional instead of unidirectional, a message flow may be identified at a different protocol layer level than that of transport service access points, or a message flow may be identified responsive to other factors. These other factors may include one or more of the following: information in packet headers, packet length, time of packet transmission, or routing conditions on the network (such as relative network congestion or administrative policies with regard to routing and transmission).

In accordance with the illustrated embodiments, and with reference to FIG. 4, shown is a router device 107, which may be pre-existing network infrastructure (as mentioned above) (such as a network router) configured to execute mitigation techniques for preventing network attacks by bad traffic 162 in the packet message flow 160 received from one or more source devices 103. For exemplary and ease of description purposes, a network attack is to be understood to be a DoS/DDoS attack whereby the mitigation techniques include one or more actions to thwart such a DoS/DDoS attack including (but not limited to): dropping blacklisted traffic; rate limiting traffic; quarantining/isolating traffic, as well as like other measures for thwarting such a DoS/DDoS attack. Router device 107 (which is understood to be a pre-existing network device as mentioned above) preferably includes a network security filter 410 that enable router 107 to perform the aforesaid one or mitigation actions on the "bad" traffic 162 in the traffic message flow 160, thus preventing a DoS attack upon the destination device 106. It is to be also understood that the network security filter 410, while being configured to prevent passage of "bad" (attack) traffic 162, is likewise configured to permit "good" (e.g., legitimate) traffic 164 to reach the intended destination device 106 unimpeded by the network security filter 410. Thus, it is imperative that the network security filter 410 is configured with the proper settings, in view of the real-time traffic packet message flow 160 for optimally achieving this balance.

In accordance with the illustrated embodiments, a network monitoring device 104 is operatively coupled to the router device 107, the functionality of which will be described below in accordance with FIG. 5. In the exemplary embodiment shown in FIGS. 3 and 4, and for ease of description purposes, network monitoring device 104, preferably receives telemetry data 420 (e.g., traffic flow records) exported from router device 107, which includes information regarding the network traffic 106 flowing through the network 100 via communication link 107, preferably using standard protocols such as Netflow, IPFIX, and sFlow. An example of such a monitoring device 104 may include the Arbor Sightline™ device, commercially available from NetScout Technologies Inc.

In accordance with the illustrated embodiments, the network monitoring device 104 processes flow records 420 for providing detailed traffic visibility into traffic flow 160 passing through a network 100. It is to be appreciated, these flow records 420 indicate whether packets 150 in the message flow 160 was either passed or dropped by the router 107, for instance. Additionally, the network monitoring device 104 is further configured and operable to manage the network blocking rules (e.g., the network security filter settings) employed by the router 107 preferably using BGP Flowspec and/or other capable technologies. As described below with reference to the flowchart of FIG. 5, the network monitoring device is configured and operable to provide detailed visibility into "bad" traffic 162 being dropped by the network router device 107 due to its current network security settings 410. Thus, it is to be understood that the network monitoring device 104, in accordance with the illustrated embodiments, is configured and operable to correlate the flow data 420 it receives regarding the blocking rules 410 (e.g., network security filter settings) it is currently managing for the network 100. This correlation enables network monitoring device 104 to provide detailed reporting and analytical information regarding, for instance, which traffic packets 150 was dropped, where, why, as well as further details regarding the nature of the dropped traffic. This analytical information can then be integrated into comprehensive alert and mitigation reporting so as to associate it with other security-related activities.

With the exemplary computing network 100 and network monitoring device 104 being generally shown and discussed above, a preferred method of operation will now be described. With reference now to FIG. 5, shown is a flow chart demonstrating implementation of the various exemplary embodiments. It is noted that the order of steps shown in FIG. 5 is not required, so in principle, the various steps may be performed out of the illustrated order. Also certain steps may be skipped, different steps may be added or substituted, or selected steps or groups of steps may be performed in a separate application following the embodiments described herein.

Figure 5:
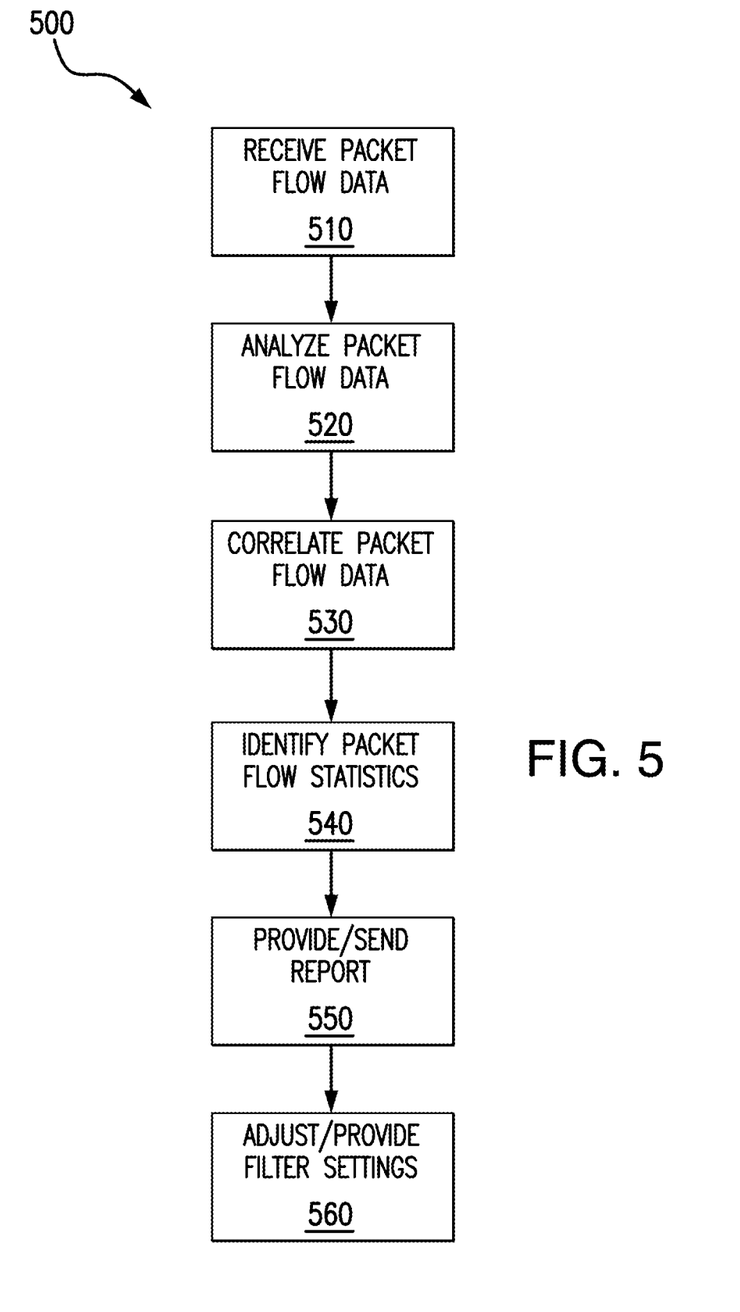
FIG. 5 illustrates a method performed in accordance with the illustrated embodiments.

With reference to exemplary process 500 shown in FIG. 5 (with continuing reference to FIGS. 1-4), described is a method for analyzing network packet traffic flow 160 affected by blocking rules (e.g., prescribed security filter settings) 410 associated with a network security device (e.g., a network router) 107. Starting at step 510, in the network monitoring device 104, packet traffic flow data 420 is respectively received from one or more network security devices 107 that preferably filter data packets 150 in network traffic flow 160 based upon network security filter settings 410 prescribed in a network security device 107.

It is to be appreciated that the network security device 107 may preferably consist of pre-existing network infrastructure configured to perform network security functionality for preventing network attacks in a network traffic flow 160, as mentioned above. An example of such pre-existing network infrastructure (which is not to be limited thereto) configured to perform such network security functionality is a network router device 107. As shown in the exemplary illustrated embodiments of FIGS. 3 and 4, the network router device 107 is located upstream of the network monitoring device 104 relative to the network packet traffic flow 160. Additionally, in accordance with the illustrated exemplary embodiments, the network router device 107 preferably exports telemetry data 420 to the network monitoring device 104 regarding network traffic flow data (e.g., flow records) indicating performance metrics associated with the network security settings 410 of the router device 107 (e.g., affects upon the network traffic flow 160 caused by the blocking rules 410 of the router device 107). For instance, a network protocol utilized for sending the telemetry data 420 from the network router device 107 to the network monitoring device 104 may include Netflow, IPFIX, and sFlow.

Next at step 520, the network monitoring device 104 analyzes the received packet traffic flow data (e.g., telemetry data) 420 by correlating the received traffic flow data 420 with the security filter settings 107 prescribed in the network router device 107, step 530. As described below, the network monitoring device 104 preferably contains the current network security settings (e.g., blocking rules) as prescribed in the router device 107). Next, step 540, certain statistics are then identified by the network monitoring device 104 regarding the network traffic flow 160 affected by the security filter settings 410 of the network router device 107 based upon the correlating of the received traffic flow data (the telemetry data) 420 with the current network security settings 410 prescribed in the network router device 107.

In accordance with the exemplary illustrated embodiments, the aforesaid identified statistics are then preferably reported to a network administrator, step 550. The identified statistics may be reported to the network administrator via one or more of: a graphical user interface (GUI), Application Program Interface (API) and a Command-Line Interface. It is to be understood the identified statistics may indicate whether a network attack is currently ongoing based upon the identifying of certain statistics regarding the traffic flow 160 (step 540). It is to be appreciated that the identified statistics may indicate change characteristics imparted upon the traffic flow 160 by the indicated ongoing network attack so as to indicate how the current network attack is changing. Additionally, the reported identified statistics may indicate to a network administrator one or more data parameters associated with a network attack, such as (but not to be understood to be limited to): origin country, IP address, network, and associated organization and types of the traffic included in a network attack.

Further in accordance with the illustrated embodiments, the network monitoring device 104 may adjust the security filter settings 410 prescribed in the network router device 107 based upon its analysis of the traffic flow data 410 received from the network monitor device 107 (as described above), step 560. Preferably this is performed without user intervention. The prescribed security filter settings 410 of the router device 107 are preferably adjusted by the monitoring device 104 to mitigate legitimate traffic flow (e.g., good traffic 164) from being adversely effected by the prescribed security filter settings 410 of the network router device 107. Preferably a BGP flowspec route is utilized between the network monitoring device 104 and the network router device 107 for prescribing the adjusted security filter settings in the router device 107.

Accordingly, it is to be appreciated and understood, and in accordance with the illustrated exemplary embodiments, a network monitoring device 104 has been described which is implemented in a communication network 100 and coupled to pre-existing network infrastructure devices 107 in the communication network 100 to provide unique traffic information being impacted by the various blocking rules and technologies in the network 100. Thus, network operators may utilize the network monitoring device 104 to obtain network traffic visibility, even if they are using security tools from differing vendors.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer-implemented method for analyzing network packet traffic flow affected by a network security device, comprising the steps:

receiving, in a network monitoring device, packet traffic flow data from a network security device that filters network traffic based upon prescribed security filter settings;

analyzing, in the network monitoring device, the received packet traffic flow data by correlating the received traffic flow data with the security filter settings prescribed in the network security device;

identifying certain statistics regarding the network traffic flow affected by the security filter settings of the network security device based upon the correlating of the received traffic flow data with the security filter settings prescribed in the network security device;

automatically adjusting the prescribed security filter settings based upon the analyzing of the received traffic flow data associated with the prescribed security filter settings, and identifying certain statistics regarding the analyzed traffic flow; and reporting the identified statistics to a network administrator.

2. The computer-implemented method as recited in claim 1, wherein the prescribed security filter settings are adjusted to mitigate legitimate traffic flow from being effected by the prescribed security filter settings of the network security device.

3. The computer-implemented method as recited in claim 1, wherein the adjusted security filter settings are sent from the network monitoring device to the network security device without user intervention.

4. The computer-implemented method as recited in claim 3, wherein a BGP flowspec route is utilized between the network monitoring device and the network security device for prescribing the adjusted security filter settings in a security filter of the network security device.

5. The computer-implemented method as recited in claim 1, wherein the network security device is a network router device.

6. The computer-implemented method as recited in claim 5, wherein the network router device is located upstream of the network monitoring device relative to the network packet traffic flow.

7. The computer-implemented method as recited in claim 1, wherein the network security device exports telemetry data to the network monitoring device regarding network traffic flow data received by the network monitoring device wherein the telemetry data traffic flow records indicate performance metrics associated with the network security filter.

8. The computer-implemented method as recited in claim 7, wherein a network protocol utilized for sending the telemetry data from the network security device to the network monitoring device is selected from the group consisting of: Netflow, IPFIX, and sFlow.

9. The computer-implemented method as recited in claim 1, wherein reporting the identified statistics to a network administrator includes indicating whether a network attack is currently ongoing based upon the identifying certain statistics regarding the traffic flow.

10. The computer-implemented method as recited in claim 1, wherein reporting the identified statistics to a network administrator includes reporting traffic flow change characteristics associated with the indicated ongoing network attack so as to indicate how the current network attack is changing.

11. The computer-implemented method as recited in claim 1, wherein reporting the identified statistics to a network administrator includes one or more data parameters associated with a network attack: origin country, IP address, network, and organization.

12. The computer-implemented method as recited in claim 1, wherein reporting the identified statistics to a network administrator includes indicating the types of the traffic included in a network attack.

13. The computer-implemented method as recited in claim 1, wherein the identified statistics are reported to the network administrator via one or more of: a graphical user interface (GUI), Application Program Interface (API) and a Command-Line Interface.

14. A network monitoring device for analyzing network packet traffic flow affected by a network router device configured to filter network traffic flow, comprising:
 a memory configured to store instructions;
 a processor disposed in communication with the memory, wherein said processor upon execution of the instructions is configured to:
 receive packet traffic flow data from at least one network router device that filters network traffic based upon prescribed security filter settings;
 analyze the received packet traffic flow data by correlating the received traffic flow data with the security filter settings prescribed in the at least one network router device;
 identifying certain statistics regarding the network traffic flow affected by the security filter settings of the at least one network router device based upon the correlating of the received traffic flow data with the security filter settings prescribed in the at least one network router device;
 automatically adjusting the prescribed security filter settings based upon the analyzing of the received traffic flow data associated with the prescribed security filter settings, and identifying certain statistics regarding the analyzed traffic flow; and
 reporting the identified statistics to a network administrator.

15. The network monitoring device as recited in claim 14, wherein the prescribed security filter settings are adjusted to mitigate legitimate traffic flow from being effected by the prescribed security filter settings of the at least one network router device.

16. The network monitoring device as recited in claim 15, wherein a BGP flowspec route is utilized between the network monitoring device and the at least one network router device for prescribing the adjusted security filter settings in a security filter of the at least one network router device.

17. The network monitoring device as recited in claim 16, wherein the at least one network router device exports telemetry data to the network monitoring device regarding network traffic flow data received by the at least network router device wherein the telemetry data traffic flow records indicate performance metrics associated with the network security filter.

18. The network monitoring device as recited in claim 17, wherein reporting the identified statistics to a network administrator includes indicating whether a network attack is currently ongoing based upon the identifying certain statistics regarding the traffic flow.

\* \* \* \* \*